(12) United States Patent
Calkins et al.

(10) Patent No.: US 11,767,104 B2
(45) Date of Patent: Sep. 26, 2023

(54) VORTEX GENERATOR

(71) Applicant: The Boeing Company, Chicago, IL (US)

(72) Inventors: Frederick T. Calkins, Renton, WA (US); Paul M. Vijgen, Everett, WA (US); Douglas E. Nicholson, Saint Charles, MO (US); Andrew Walter Fassmann, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/580,934

(22) Filed: Jan. 21, 2022

(65) Prior Publication Data

US 2022/0340265 A1    Oct. 27, 2022

Related U.S. Application Data

(60) Provisional application No. 63/178,169, filed on Apr. 22, 2021.

(51) Int. Cl.
*B64C 23/06* (2006.01)
*B64D 41/00* (2006.01)

(52) U.S. Cl.
CPC .............. *B64C 23/06* (2013.01); *B64D 41/00* (2013.01)

(58) Field of Classification Search
CPC ..................................................... B64C 23/06
See application file for complete search history.

(56) References Cited

U.S. PATENT DOCUMENTS

| | | | |
|---|---|---|---|
| 8,657,238 B2 | 2/2014 | Fox et al. | |
| 9,638,176 B2* | 5/2017 | Shivashankara | B64C 23/06 |
| 9,789,956 B2 | 10/2017 | Bordoley et al. | |
| 2009/0212158 A1* | 8/2009 | Mabe | F03G 7/065 |
| | | | 244/1 N |
| 2020/0156761 A1* | 5/2020 | Tillotson | B64C 3/58 |
| 2020/0369364 A1* | 11/2020 | Dodt | B64C 9/36 |
| 2020/0398971 A1* | 12/2020 | Guo | B64C 23/06 |

* cited by examiner

*Primary Examiner* — Timothy D Collins
*Assistant Examiner* — Brendan Kroger Schneider
(74) *Attorney, Agent, or Firm* — JORDAN IP LAW, LLC (57) ABSTRACT

A vortex generator, includes a vane, mountable on an aerodynamic surface of an aircraft, and an actuator that rotates the vane between a stowed position and a deployed position. The actuator includes a linear actuator, composed at least in part of a shape memory alloy (SMA), that when thermally activated facilitates rotation of the vane between the stowed position to the deployed position. Thermal activation of the SMA is caused via one or more of joule heating, conduction, and induction in response to one or more of an electronic command signal and a wireless command signal. The electronic command signal and the wireless command signal may be transmitted in response to ambient conditions, aircraft flight conditions, and aircraft mission.

20 Claims, 11 Drawing Sheets

VORTEX GENERATOR

CROSS REFERENCE TO RELATED APPLICATIONS

This U.S. Non-provisional patent application claims benefit of priority to U.S. Provisional Patent Application No. 63/178,169 filed Apr. 22, 2021.

FIELD

One or more examples relate generally to a vortex generator that optimizes flight performance and minimizes drag. More particularly, one or more examples relate to a vortex generator comprising in whole or in part a shape memory alloy that when thermally activated via one or more of joule heating, conduction, and induction in response to one or more of an electronic command signal and a wireless command signal, causes rotation of a vane of the vortex generator between a stowed position and a deployed position. The electronic command signal and the wireless command signal may be in response to ambient conditions, aircraft flight conditions, and aircraft mission.

BACKGROUND

In aeronautical applications, conventional vortex generators (VG) are static vanes mounted on a surface of an aircraft to improve aircraft efficiency during take-off and landing. When not needed, however, such as during the cruise phase of flight, these static devices are always maintained in a deployed position, and thus, produce drag penalties.

SUMMARY

In one or more example embodiments, a vortex generator is provided which can be stowed when not needed and then deployed selectively on command or automatically in response to ambient conditions, aircraft flight conditions, and aircraft mission.

The actuation element comprises a low profile, high-rate shape memory alloy (SMA) actuator that causes rotation of the vane between the stowed position and the deployed position. The actuator, composed of a shape memory alloy (SMA), is operatively connected to the vane to deploy the vane from a stowed position, or retract the vane to the stowed position when it is not needed.

In one or more example embodiments, an aircraft system comprises one or more of the following: a vortex generator that includes a vane, mountable on an aerodynamic surface of the aircraft for rotation between a stowed position and a deployed position, and an actuator module operatively connected to the vane, the actuator module including a linear actuator and a rotary actuator respectively composed at least in part of a shape memory alloy (SMA); a sensor module to dynamically detect as sensor data a flight environment of the aircraft and the vortex generator; and a control module having one or more processors, operatively coupled to the sensor module, to execute, in response receipt of the sensor data, a set of instructions that cause the one or more processors to conduct flight environment analysis of the sensor data, and transmit, based on the analysis, a wireless command signal to cause thermal activation of the SMAs to selectively move the vane between the stowed position and the deployed position.

In the one or more examples of the aircraft system, the flight environment comprises one or more of current flight altitude, current ambient temperature, current position of the vane, current deployment angle of the vane, and current aerodynamic load on the vane.

In the one or more examples of the aircraft system, the vane comprises a substantially planar body having a recess formed at a side surface thereof.

In the one or more examples of the aircraft system, the linear actuator comprises a latch member operable to engage the recess to maintain the vane in the stowed position, and one or more wire members, composed of an SMA, operatively connected to the latch member, and the rotary actuator comprises a substantially cylindrical body, composed of an SMA.

In the one or more examples of the aircraft system, thermal activation of the SMA of the one or more wire members causes disengagement of the latch member from the recess and rotation of the vane from the stowed position and the deployed position.

In the one or more examples of the aircraft system, thermal activation of the SMA of the substantially cylindrical body causes rotation of the substantially cylindrical body and rotation of the vane from the deployed position to the stowed position.

In the one or more examples of the aircraft system, the aircraft system further comprises: a power source, including one or more rechargeable batteries, that is operatively connected to the control module and the actuator module; and an energy harvesting module to deliver harvested energy to the one or more rechargeable batteries.

In one or more example embodiments, a vortex generator comprises one or more of the following: a vane, mountable on an aerodynamic surface of the aircraft for rotation between a stowed position and a deployed position; and an actuator module operatively connected to the vane, the actuator module including a linear actuator and a rotary actuator respectively composed at least in part of a shape memory alloy (SMA) operable to, when thermally activated in response to a wireless command signal, selectively rotate the vane between the stowed position and the deployed position.

In the one or more examples of the vortex generator, the wireless command signal is sent in response to a flight environment analysis of one or more of current flight altitude, current ambient temperature, current position of the vane, current deployment angle of the vane, and current aerodynamic load on the vane.

In the one or more examples of the vortex generator, the vane comprises a substantially planar body having a recess formed at a side surface thereof.

In the one or more examples of the vortex generator, the linear actuator comprises a latch member operable to engage the recess to maintain the vane in the stowed position, and one or more wire members, composed of an SMA, operatively connected to the latch member, and the rotary actuator comprises a substantially cylindrical body, composed of an SMA.

In the one or more examples of the vortex generator, thermal activation of the SMA of the one or more wire members causes disengagement of the latch member from the recess and rotation of the vane from the stowed position and the deployed position.

In the one or more examples of the vortex generator, thermal activation of the SMA of the substantially cylindrical body causes rotation of the substantially cylindrical body and rotation of the vane from the deployed position to the stowed position.

In the one or more examples of the vortex generator, the vortex generator further comprises: a power source, including one or more rechargeable batteries, that is operatively connected to the control module and the actuator module; and an energy harvesting module to deliver harvested energy to the one or more rechargeable batteries.

In one or more example embodiments, a method of operating an aircraft comprises one or more of the following: dynamically detecting a flight environment of the aircraft and a vortex generator an aircraft and a vortex generator that is mountable on an aerodynamic surface of the aircraft, the vortex generator comprising a vane and an actuator module operatively connected to the vane, the actuator module including a linear actuator and a rotary actuator respectively composed at least in part of a shape memory alloy (SMA); dynamically conducting a flight environment analysis of the flight environment; and thermally activating on wireless command, based on the analysis, the SMA to selectively cause rotation of the vane between a stowed position and a deployed position.

In the one or more examples of the method, the analysis is conducted on one or more of current flight altitude, current ambient temperature, current position of the vane, current deployment angle of the vane, and current aerodynamic load on the vane.

In the one or more examples of the method, the vane comprises a substantially planar body having a recess formed at a side surface thereof.

In the one or more examples of the method, the linear actuator comprises a latch member operable to engage the recess to maintain the vane in the stowed position.

In the one or more examples of the method, the linear actuator comprises one or more wire members, composed of an SMA, and operatively connected to the latch member, and thermally activating the SMA comprises thermally activating the SMA of the one or more wire members to cause disengagement of the latch member and the recess and rotation of the vane from the stowed position and the deployed position.

In the one or more examples of the method, the rotary actuator comprises a substantially cylindrical body, composed of an SMA, and thermally activating the SMA comprises thermally activating the SMA of the substantially cylindrical body to rotate the substantially cylindrical body and cause rotation of the vane from the deployed position to the stowed position.

The features, functions, and advantages that have been discussed are achieved independently in various examples or, are combined in yet other examples further details of which is seen with reference to the following description and drawings.

DRAWINGS

The various advantages of the examples of the present disclosure will become apparent to one skilled in the art by reading the following specification and appended claims, and by referencing the following drawings, in which:

DESCRIPTION

In the one or more illustrated examples of FIGS. 1A to 1D, a vortex generator 10 comprises a vane 20, a base frame 30, and an actuator 40 which is operable to cause or otherwise facilitate rotation (e.g., between approximately 0 to 90°) of the vane 20 relative to the base frame 30 between a stowed position (approximately 0°) and a deployed position (approximately 90°) in response to ambient conditions (e.g., via an ambient temperature causing heating of the SMA), aircraft conditions (e.g., aircraft operating at a threshold flight altitude), an electronic command signal from a control module 50, and a wireless command signal from the control module 50.

The base frame 30 is configured for mounting on an aerodynamic surface of the vehicle which comprises, for example, an aircraft, a spacecraft vehicle, a marine vehicle, and a land vehicle. This disclosure, however, contemplates the vortex generator 10 to have application in a variety of stationary and non-stationary applications that fall within the spirit and scope of the principles of this disclosure set forth herein. Although illustrated examples include a base frame 30 having a structural configuration that is to be mounted on the aerodynamic surface of the aircraft, examples are not limited thereto. Thus, this disclosure contemplates the base frame 30 having any suitable structural configuration that falls within the spirit and scope of the principles of this disclosure set forth herein. For example, the base frame 30 can comprise a structural configuration that is unitary with, and consist of a portion of, the aerodynamic surface of the aircraft. Although the illustrated example shows holes H for the mechanical attachment of the base frame 30 to the aerodynamic surface, examples are not limited thereto. This disclosure contemplates attachment of the base frame 30 to the aerodynamic surface in any manner that falls within the spirit and scope of the principles of this disclosure set forth herein. For example, the base frame 30 may be formed integrally with the aerodynamic surface, or attached via one or more of adhesives, welding, and brazing.

The base frame 30 comprises a planar body defining an opening 31 that is sized and shaped to receive the vane 20 when the vane is in the stowed position. Particularly, the upper most surface of the base frame 30 comprises a recess 32 at the opening 31 that is to support at least a portion of the vane 20 when the vane is in the stowed position such that the vane 20 is substantially flush, parallel, or coplanar with the base frame 30. In one or more example embodiments, the base frame 30 is composed, in whole or in part, of a ferromagnetic material capable of withstanding aerodynamic loading. Such a ferromagnetic material comprises one or more of a metal, a metal alloy, or a composite material. Such a metal alloy comprises, for example, an aluminum alloy (7075 Aluminum), steel (15-5PH Stainless Steel), or titanium (Ti 6Al-4V). Example materials disclosed herein, however, are not limited thereto, and thus, this disclosure contemplates the base frame 30 being composed of any suitable material that falls within the spirit and scope of the principles of this disclosure set forth herein.

In one or more illustrated examples, the vane 20 is spring-loaded in the stowed position by one or more torsional springs 34 arranged having one or more coil members wound concentrically around the rotary actuator 42 and leg members operatively coupled to the base frame 30. The vane 20 comprises a generally planar body having a leading edge 21, a trailing edge 22, and an outer edge 23 that define side surfaces 24, 25. The leading edge 21, which is spatially arranged upstream of the trailing edge 22, comprises a generally arcuate or aerodynamic shape or cross-section such that, during deployment of the vortex generator 10, is oriented to encounter ambient air flowing over the aerodynamic surface of the aircraft in forward motion of the aircraft in flight. The trailing edge 22 comprises a straight shape or cross-section or a tapered shape or cross-section. In one or more example embodiments, the vane 20 is composed, in whole or in part, of a ferromagnetic material capable of withstanding aerodynamic loading during flight of the aircraft. Such a ferromagnetic material comprises one or more of a metal, a metal alloy, or a composite material. Such a metal alloy comprises, for example, an aluminum alloy (7075 Aluminum), steel (15-5PH Stainless Steel), or titanium (Ti 6Al-4V). Example materials disclosed herein, however, are not limited thereto, and thus, this disclosure contemplates the base frame 30 being composed of any suitable material that falls within the spirit and scope of the principles of this disclosure set forth herein. In one or more example embodiments, the vane 20 is composed of the same material as the base frame 30.

Figure 1A:
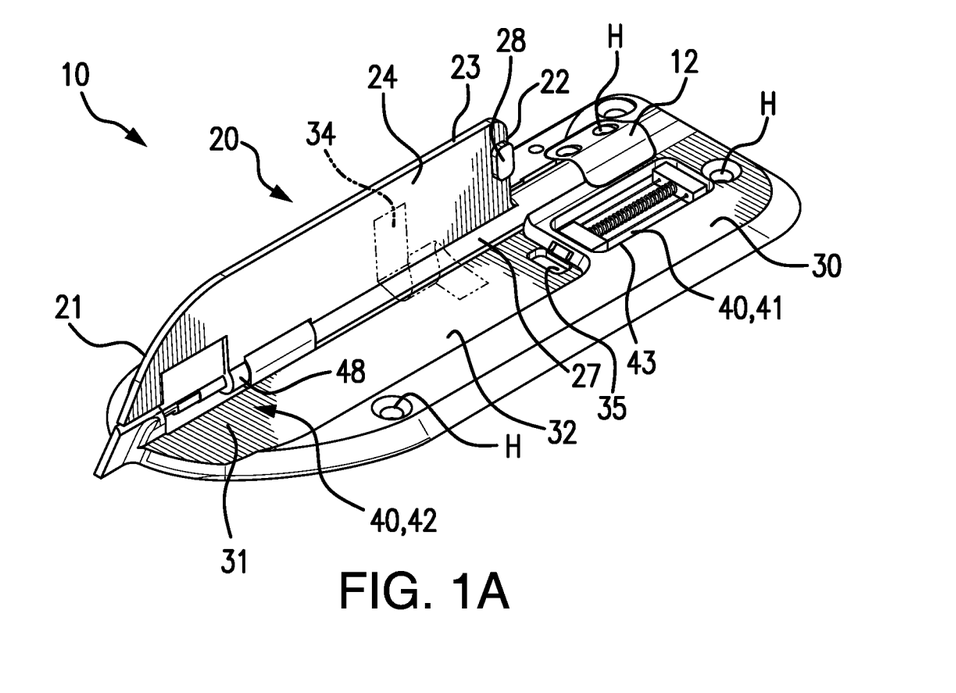
FIGS. 1A to 1D respectively illustrate an advantageous example of a vortex generator in a stowed position and a deployed position.
Figure 1B:
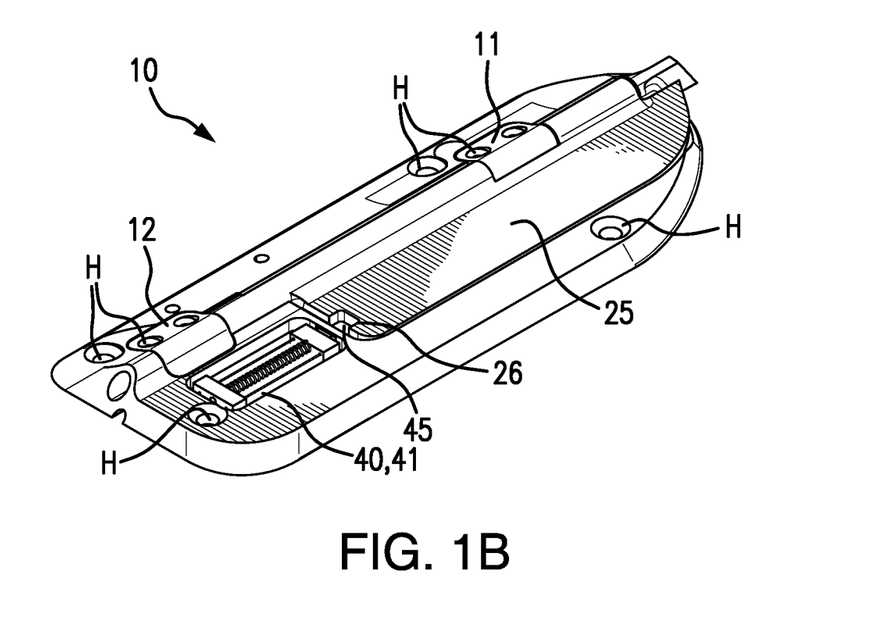
Figure 1C:
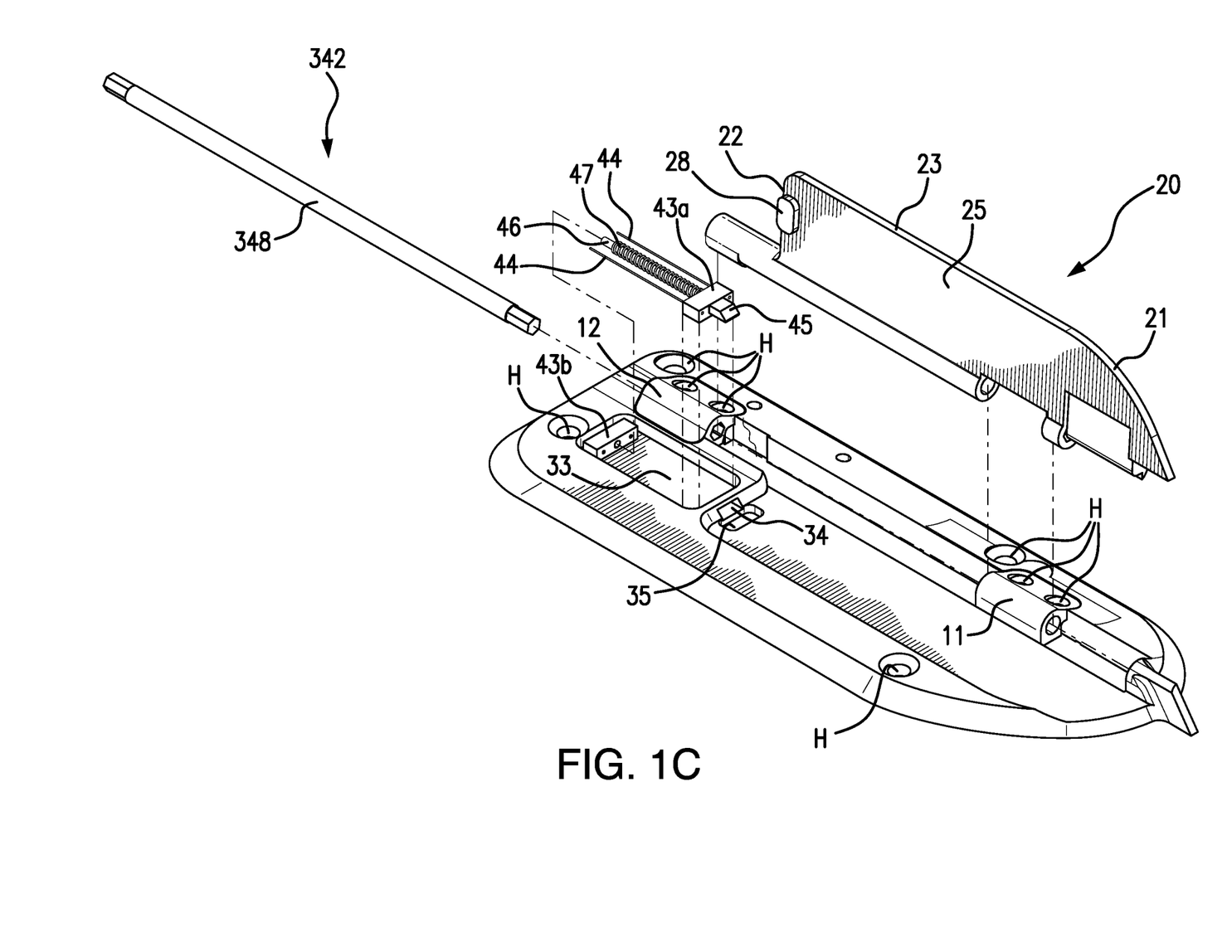
Figure 1D:
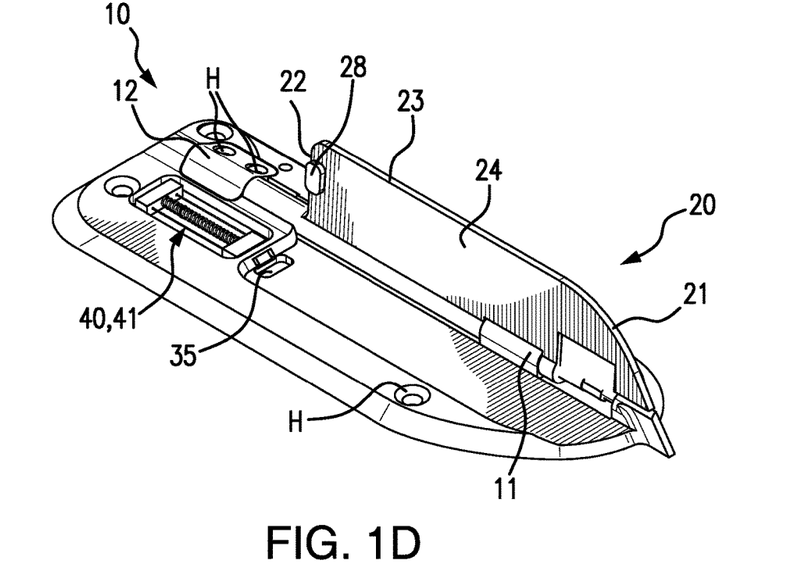

In the illustrated example of FIG. 1B, a region of the side surface 25 adjacent to the trailing edge 22 comprises a recess 26 which is sized to receive or be engaged by a latch member 45 of a linear actuator mechanism 41 of the actuator 40. As will be discussed herein, this latch connection is to maintain the vane 20 in the stowed position against the biasing force/spring load of one or more torsional springs 34. The selective and/or automatic unlatching of the latch member 45 facilitates rotation of the vane 20 to the deployed position by force of the aerodynamic load and the biasing force/spring load of the torsion spring 34.

At the hinge line at the lower region of the vane 20 is a bore or channel extending longitudinally therethrough to concentrically receive a rotary actuator mechanism 42 of the actuator 40. The rotary actuator mechanism 42 is mechanically coupled or fixed to the vane 20 via one or more set of mechanical fasteners to facilitate rotation of the vane 20 relative to the base frame 30. The vane 20, via its connection to the rotary actuator mechanism 42, is operable to rotate between the stowed position and a deployed position. In the stowed position, the vane 20 is substantially flush, parallel, or coplanar with the base frame 30, while in the deployed position, the vane 20 is substantially perpendicular relative to the base frame 30 and the aerodynamic surface.

A first journal bearing 11 and a second journal bearing 12 are respectively operable to rotatably receive the rotary actuator mechanism 42. Although the illustrated example shows holes H for the mechanical attachment of the first journal bearing 11 and the second journal bearing 12 to the base frame 30, examples are not limited thereto. This disclosure contemplates attachment of the first journal bearing 11 and the second journal bearing 12 to the base frame 30 in any manner that falls within the spirit and scope of the principles of this disclosure set forth herein. For example, the first journal bearing 11 and the second journal bearing 12 may be formed integrally with the base frame 30, or attached via one or more of adhesives, welding, and brazing.

In one or more example embodiments, the actuator 40 comprises the linear actuator mechanism 41 and the rotary actuator mechanism 42, each of which is respectively composed in whole or in part of a shape memory alloy (SMA). The actuator 40 is operable to, when selectively and/or automatically activated, cause rotation of the vane 20 between the stowed position and the deployed position. In one or more example embodiments, the thermal activation of the SMA is caused via one or more of joule heating, conduction, and induction in response to one or more of an electronic command signal from the control module 50 and a wireless command signal from the control module 50. The electronic command signal and the wireless command signal from the control module 50 may be in response to ambient conditions, aircraft flight conditions, and aircraft mission.

In one or more example embodiments, the linear actuator mechanism 41 is operable to serve as a trigger mechanism which facilitates rotation of the vane 20 to the deployed position. In the illustrated example, the linear actuator mechanism 41 is arranged in a second recess 33 of the base frame 30. The linear actuator mechanism 41 comprises a pair of spaced apart guide members, namely, forward guide member 43a and aft 43b guide member, one or more wire members 44, and a latch member 45 extending from a stem member 46 that is set in position in the second recess 33 by the forward guide member 43a and the aft 43b guide member. The one or more wire members 44, composed of an SMA, are operatively connected to the latch member 45, which facilitates linear movement of the latch member 45 in the second recess 33. One or more bias mechanisms, such as, for example, one or more spring members 47, is received on the stem member 46 to place a biasing force on the latch member 45. Particularly, upon selective or automatic thermal activation of the wire members 44 via one or more of resistance heating, convection heating, induction heating, etc. in response to an electronic command signal from the control module 50 or a wireless command signal from the control module 50, the latch member 45 is caused to move in a forward direction via the stem member 46 and the one or more spring members 47. Such forward movement in the second recess 33 causes the latch member 45 to extend at least partially through a hole 36 at the second recess 33 of the base frame 30 for engagement with the recess 26. Such engagement assists in locking or otherwise maintaining the vane 20 in the stowed position against the biasing force of the torsion spring 34.

In one or more example embodiments, the side surface 24 of the vane 20 comprises a boss or extension member 28 that sets the vane 20 in the stowed position by its receipt in a second recess 35 of the base frame 30 that has a shape or cross-section that corresponds to the shape or cross-section of the boss or extension member 28.

In one or more example embodiments, a magnetic bias is provided to further assist in moving the vane 20 from the deployed position to the stowed position and maintaining the vane 20 in the stowed position. The vane 20 can act as a first magnetic element and one or more second magnetic elements may be placed under or embedded in the surface of the second recess 33 of the base frame 30. The magnetic attraction between the vane 20 and the second recess 33 creates a supplemental torque that magnetically biases the vane 20 from the deployed position to the stowed position, and also magnetically maintains the vane 20 in the stowed position against the biasing force of the torsion spring 34.

The latch member 45 is selectively or automatically moved to a retracted position away from the recess 26 to thereby disengage the recess 26 and cause rotation of the vane 20 to the deployed position. While the illustrated example shows the linear actuator mechanism 41 comprises one or more SMA wire members 44, embodiments are not limited thereto. This disclosure contemplates that the linear actuator mechanism 41 comprises other configurations (e.g., a solenoid) that fall within the spirit and scope of the principles of this disclosure set forth herein.

The rotary actuator mechanism 42 comprises a generally cylindrical body 48 composed of an SMA such as, for example, nickel-titanium based alloy material. The generally cylindrical body 48 is concentrically-arranged in the bore of the generally cylindrical-shaped member 27 for connection to the vane 20, and thus, defines a rotational axis about which the vane 20 rotates. When the generally cylindrical body 48 is in a cold state, i.e., the SMA is in a martensitic phase. The material composition of the SMA is such that, upon thermal activation of the generally cylindrical body 48, i.e., heated above its transformation temperature, the SMA transitions to an austenite phase, which in turn causes rotation of the generally cylindrical body 48. Thermal activation of the SMA is to cause rotation of the vane 20 from the deployed position to the stowed position. Such thermal activation of the SMA occurs via joule heating, conduction, or induction in response to one or more of an electronic command signal from the control module 50 and a wireless command signal from the control module 50. In one or more example embodiments, the electronic command signal and the wireless command signal from the control module 50 may be in response to ambient conditions, aircraft flight conditions, and aircraft mission In one or more example embodiments, the thermal activation of the SMA of the rotary actuator mechanism 42 is caused via one or more of joule heating, conduction, and induction in response to one or more of an electronic command signal from the control module 50 and a wireless command signal from the control module 50. The electronic command signal and the wireless command signal from the control module 50 may be in response to ambient conditions, aircraft flight conditions, and aircraft mission.

In an example operation of the vortex generator 10, when the aircraft is operating at low speed, the vane 20 is in a stowed position, the linear actuator mechanism 41 is in an engaged state (i.e., latched), and the SMA is in its austenite phase. When the aircraft reaches a high altitude such as for example, cruise altitude, the low temperatures at cruise altitude causes transformation from the austenite phase to the martensitic phase, causing the vane 20 to retract, which resets the latch member 45.

Alternatively, In one or more example embodiments, the SMA of the rotary actuator mechanism 42 is in a martensite state when the vane 20 is caused to rotate to the deployed position via the torsion spring 34. Thermal activation of the SMA of the rotary actuator mechanism 42 causes it to twist, thereby causing the vane 20 to return to the stowed position, where it is locked by the linear actuator mechanism 41. Thermal activation of the linear actuator mechanism 41 on command from the control module 50 causes release of the vane 20 and rotation to the deployed position.

Figure 2A:
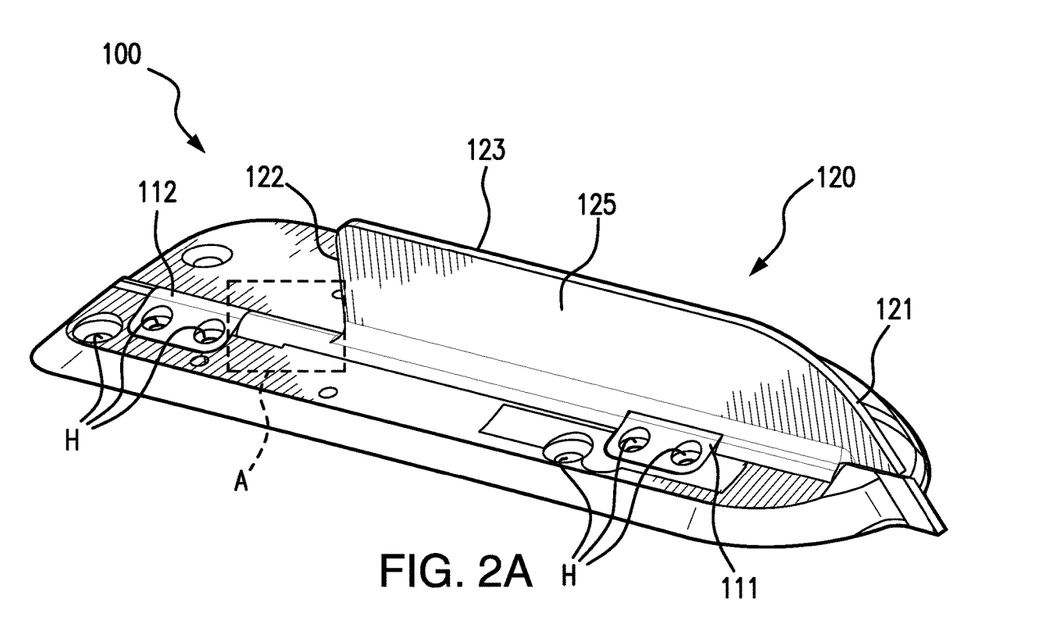
FIGS. 2A to 2C respectively illustrates an advantageous example of a vortex generator in a deployed position, and an actuator for the vortex generator, in an active state and an inactive state.
Figure 2B:
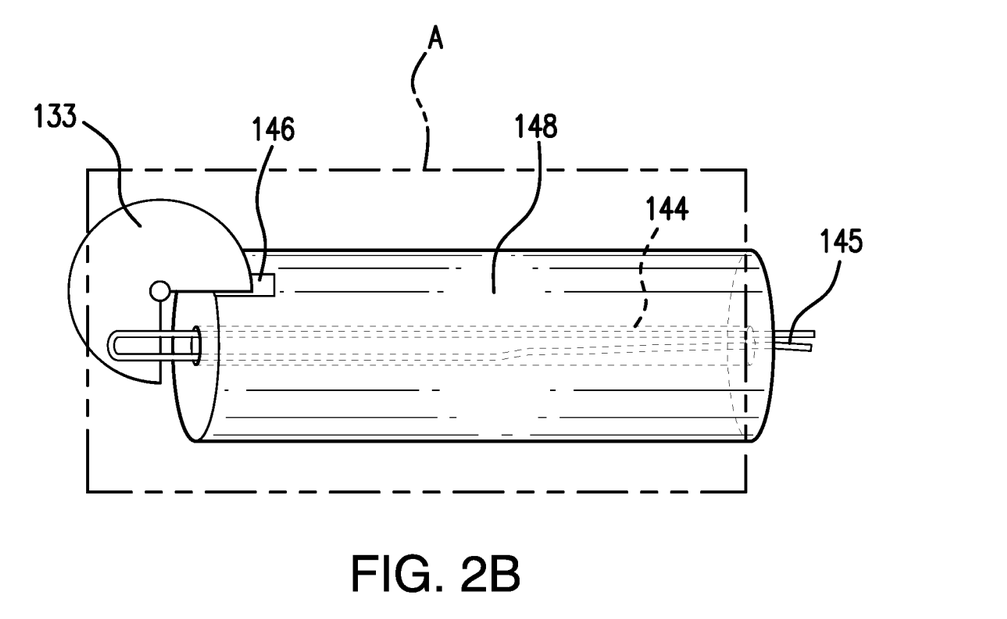
Figure 2C:
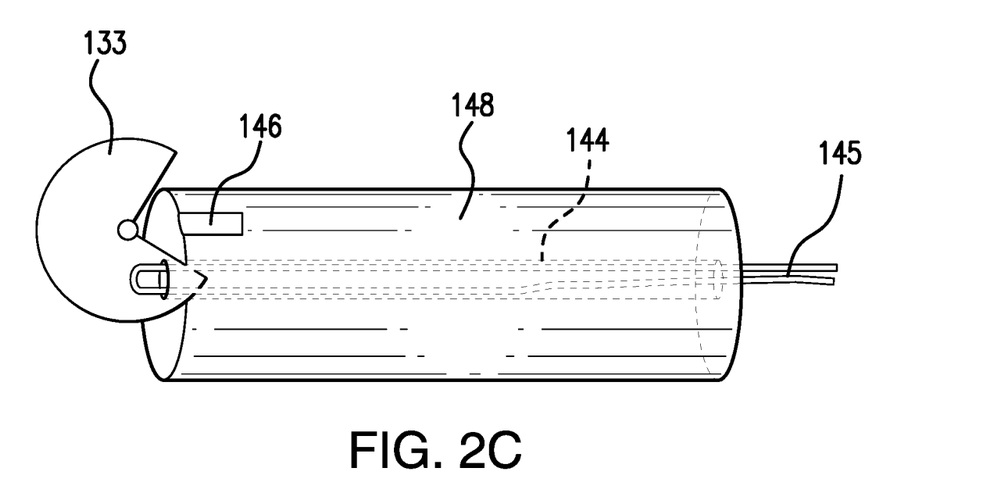

In the one or more illustrated examples of FIGS. 2A to 2C, a vortex generator 100 comprises a rotary actuator mechanism 142 having a cylindrical body 148 (composed in whole or in part of an SMA) having a central bore 144 extending longitudinally therethrough that is sized to receive one or more wire members 145 composed of an electrically-conductive material such as, for example, metal. The one or more wire members 145 is configured for electrical connection to a current source, such as, for example, a current source, conductive source. The outer surface of the generally cylindrical body 148 includes a longitudinal slot 146 sized to receive a rotary latch member 133 of the base frame 30. The rotary latch member 133 is configured for rotary movement between an engaged position and a disengaged position. The one or more wire members 145 are operatively connected to the rotary latch member 133 such that, when thermally activated via one or more of resistance heating, convection heating, induction heating, etc. in response to one or more of an electronic command signal from the control module 50 and a wireless command signal from the control module 50, causes rotation of the rotary latch member 133.

In the engaged position, the rotary latch member 133 engages the cylindrical body 148 for receipt in the longitudinal slot 146, which serves to maintain the vane 120 in the stowed position. To deploy the vane 120, the one or more wire members 145 is thermally activated via one or more of resistance heating, convection heating, induction heating, etc. in response to one or more of an electronic command signal from the control module 50 and a wireless command signal from the control module 50, causing the rotary latch member 133 to rotate counterclockwise out of the longitudinal slot 146. This rotation disengages the rotary latch member 133 from the cylindrical body 148, which facilitates rotation of the rotary actuator mechanism 142 due to the thermal activation of the SMA by the thermally-activated one or more wire members 145. The vane 120 is reset to move from the deployed position to the stowed position by deactivating the heat source from the one or more wire members 145, which in turn, removes the heat source (i.e., one or more wire members 145) from the rotary actuator mechanism 142, thereby causing the counter rotation of the cylindrical body 148 and engagement of the rotary latch member 133 with the longitudinal slot 146. In one or more example embodiments, thermal activation and deactivation of the one or more wire members 145 is caused selectively via one or more of resistance heating, convection heating, induction heating, etc. in response to one or more of an electronic command signal from the control module 50 and a wireless command signal from the control module 50.

Figure 3A:
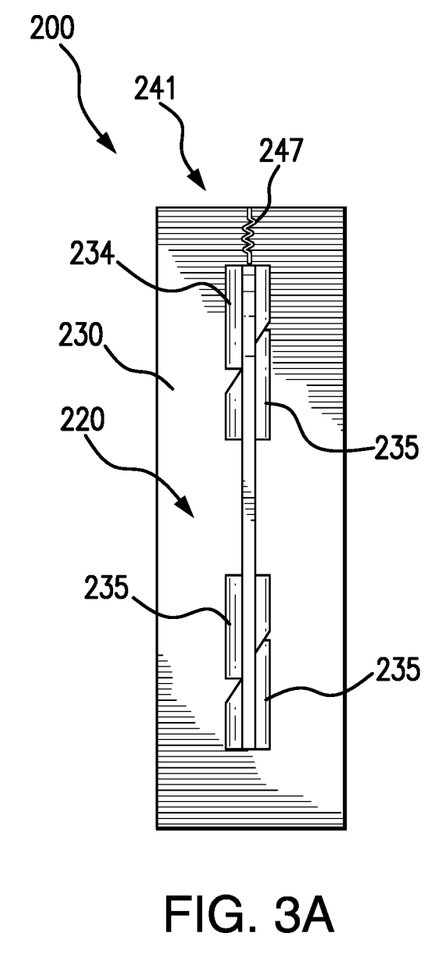
FIGS. 3A and 3B respectively illustrates an advantageous example of a vortex generator in a stowed position and a deployed position.
Figure 3B:
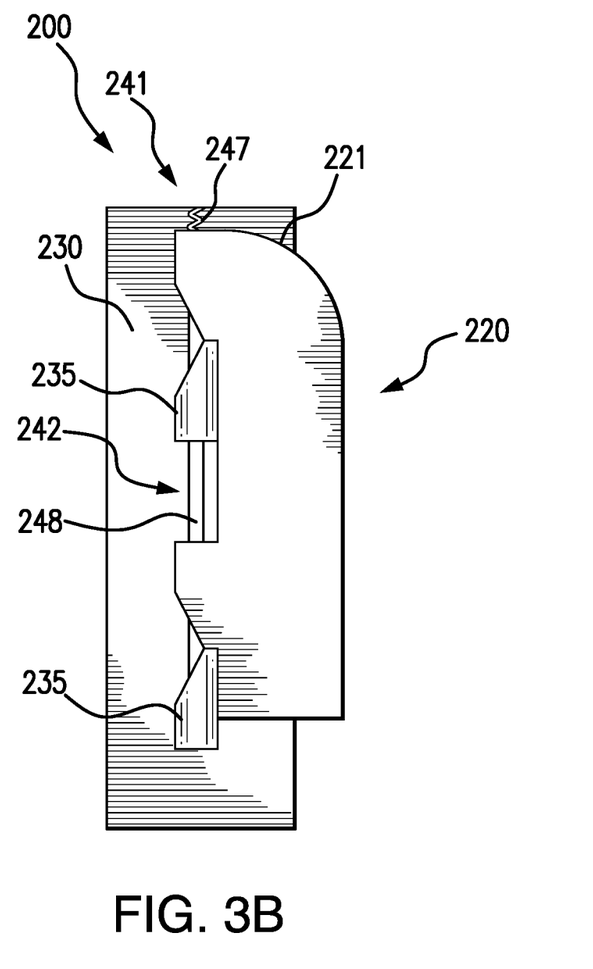
Figure 4A:
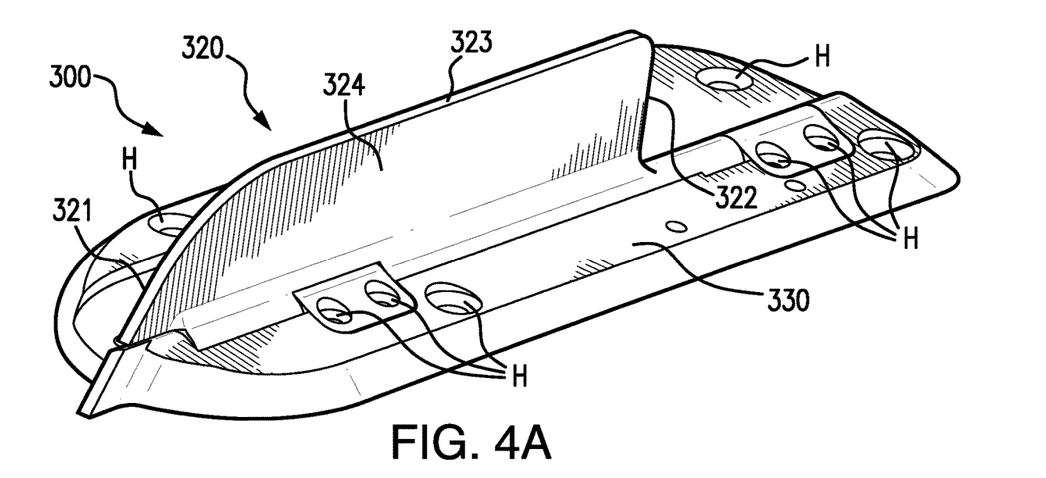
FIGS. 4A to 4D respectively illustrates an advantageous example of a vortex generator in a deployed position, and a rotary actuator for the vortex generator.
Figure 4B:
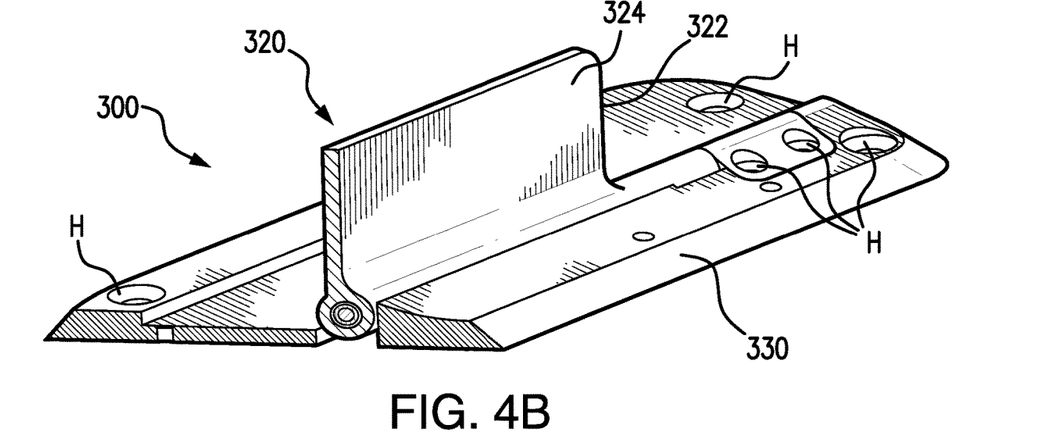
Figure 4C:
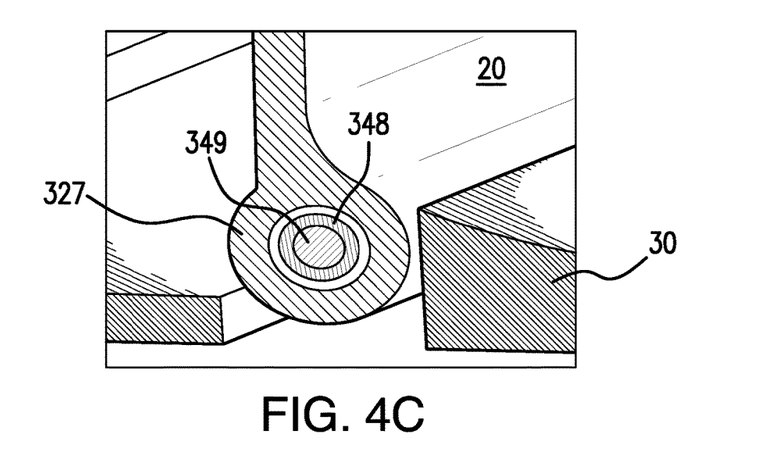
Figure 4D:
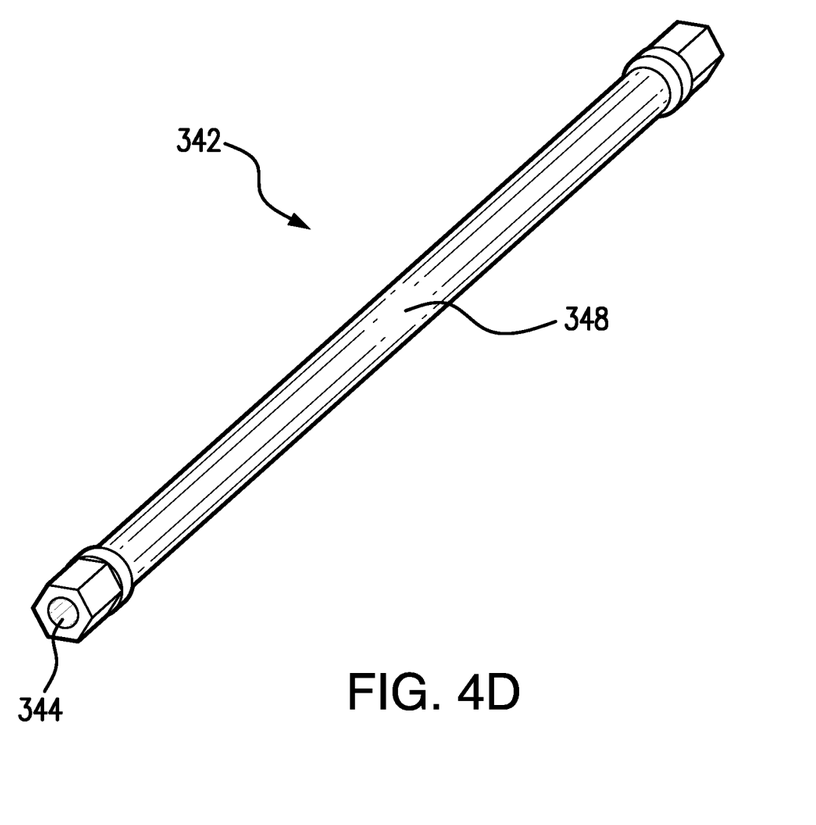

In the one or more illustrated examples of FIGS. 3A and 3B, a vortex generator 200 comprises a rotary actuator mechanism 242 having a cylindrical body 248 (composed in whole or in part of an SMA) that is spring-loaded by the linear actuator mechanism 241 comprising a linear spring 247, which is positioned at a distal end of the generally cylindrical body 248 adjacent to the leading edge 221 of the vane 220. The cylindrical body 248 is received on one or more torsion ramps 234, 235 which are mounted on the base frame 230. In a stowed position of the vane 220, the rotary actuator mechanism 242 is locked in position by the linear actuator mechanism 241. To deploy the vane 220, the SMA of the generally cylindrical body 248 is thermally activated via one or more of resistance heating, convection heating, induction heating, etc. in response to one or more of an electronic command signal from the control module 50 and a wireless command signal from the control module 50. The thermal activation of the SMA causes rotation of the cylindrical body 248, which in turn causes release of the spring load of the linear spring 247 and forces the cylindrical body 248 to move linearly to cause engagement of the torsion ramps 234, 235. The vane 220 is selectively reset on command to move from the deployed position to the stowed position by removal of the thermal source.

In the illustrated one or more examples of FIGS. 4A to 4D, a vortex generator 300 comprises a rotary actuator mechanism 342 having a cylindrical body 348 (composed in whole or in part of an SMA) with a central bore sized to receive one or more heating elements 349. Deployment of the vane 320 from the stowed position to the deployed position is caused by selectively via receipt of an electronic command signal or a wireless command signal from the control module 50 that causes activation of the heating element(s) 54, which thermally activates the SMA of the generally cylindrical body 347. Retraction of the vane 320 from the deployed position to the stowed position is caused selectively via receipt of an electronic command signal or a wireless command signal from the control module 50 that causes deactivation of the heating element(s) 54. The vane 320 is reset to move from the deployed position to the stowed position by removal of the thermal source in response to one or more of ambient conditions, aircraft flight conditions, an electronic command signal from the control module 50, and a wireless command signal from the control module 50.

Figure 5:
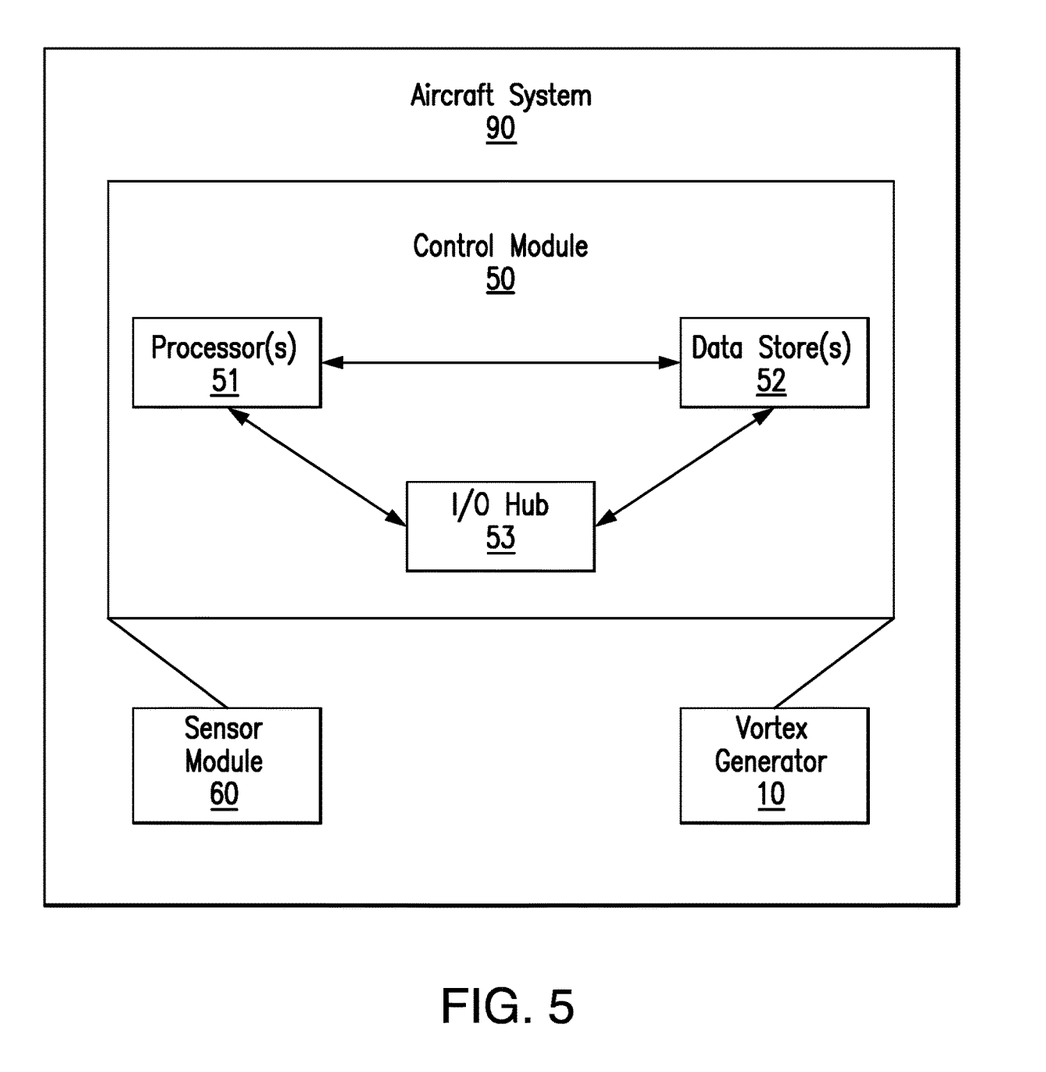
FIG. 5 illustrates a block diagram of an advantageous example of an aircraft system.

In the illustrated one or more examples of FIG. 5, an aircraft system 90 comprises the vortex generator 10, the control module 50, and a sensor module 60.

The control comprises one or more processors 51 operatively connected to one or more data stores 52. As set forth, described, and/or illustrated herein, "processor" means any component or group of components that are operable to execute any of the processes described herein or any form of instructions to carry out such processes or cause such processes to be performed. In one or more example embodiments, the processors 51 are implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. In one or more example embodiments, the processors 51 comprise at least one hardware circuit (e.g., an integrated circuit) operable to carry out instructions contained in program code. In one or more example embodiments in which there is a plurality of processors 51, such processors 51 may work independently from each other, or one or more processors 51 may work in combination with each other. In one or more example embodiments, the processors 51 may be a host, main, or primary processor of the aircraft.

The data stores 52 are operable to store one or more types of data. The aircraft may include one or more user interfaces of an I/O hub 53 that enable one or more systems thereof to manage, retrieve, modify, add, or delete, the data stored in the data stores 52. In one or more example embodiments, the data stores 52 comprise volatile and/or non-volatile memory. Examples of suitable data stores 52 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. In one or more example embodiments, the data stores 52 are a component of the processors 51, or alternatively, are operatively connected to the processors 51 for use thereby. As set forth, described, and/or illustrated herein, "operatively connected" may include direct or indirect connections, including connections without direct physical contact.

The control module comprises an I/O hub 53 operatively connected to other systems of the aircraft. In one or more example embodiments, the I/O hub 53 comprises an input interface and an output interface. In one or more example embodiments, the input interface and the output interface is integrated as a single, unitary interface, or alternatively, are separate as independent interfaces that are operatively connected.

The input interface is defined herein as any device, component, system, element, or arrangement or groups thereof that enable information/data to be entered in a machine. In one or more example embodiments, the input interface receives an input from one or more operators of the aircraft (e.g., a pilot, co-pilot, etc.) or one or more remote operators of the aircraft. In one or more example embodiments, the input interface comprises a user interface (UI), graphical user interface (GUI) such as, for example, a display, human-machine interface (HMI), or the like. Embodiments, however, are not limited thereto, and thus, this disclosure contemplates that the input interface comprises a keypad, touch screen, multi-touch screen, button, joystick, mouse, trackball, microphone and/or combinations thereof.

The output interface is defined herein as any device, component, system, element or arrangement or groups thereof that enable information/data to be presented to the operator(s) of the aircraft and/or remote operator(s) of the aircraft. The output interface may be operable to present information/data to the operator(s) and/or the remote operator(s). In one or more example embodiments, the output interface comprises one or more of a visual display or an audio display such as a microphone, earphone, and/or speaker. In one or more example embodiments, one or more components of the aircraft may serve as both a component of the input interface and a component of the output interface.

The sensor module 60 comprises one or more sensors operable to, at least during operation of the aircraft, dynamically detect, determine, assess, monitor, measure, quantify, and/or sense information about the aircraft and the flight environment external to the aircraft. As set forth, described, and/or illustrated herein, "sensor" means any device, component and/or system that can perform one or more of detecting, determining, assessing, monitoring, measuring, quantifying, and sensing something. The one or more sensors may be operable to detect, determine, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process.

In one or more example embodiments, the sensors of the sensor module 60 comprise radar sensors, lidar sensors, motion sensors, heat sensors, and image sensors (e.g., cameras). Embodiments, however, are not limited thereto, and thus, this disclosure contemplates that the sensor module comprises other sensors that fall within the spirit and scope of the principles of this disclosure set forth herein. The sensors may be operable to detect, determine, assess, monitor, measure, quantify, and/or sense information about the vortex generator 10, including the external flight environment.

The sensor module 60 (including the one or more sensors thereof) is operatively connected to the processors 51, the data stores 52, and/or other elements, components, modules of the aircraft. The one or more sensors are mounted or otherwise positioned in any suitable location with respect to the aircraft. In one or more example embodiments, the one or more sensors are located in one or more of: within the aircraft, on one or more aerodynamic surfaces of the aircraft, and within one or more components of the aircraft. This disclosure contemplates locating the one or more sensors in any suitable that fall within the spirit and scope of the principles of this disclosure set forth herein.

In one or more example embodiments, the one or more sensors work independently from each other, or alternatively, work in combination with each other. In one or more example embodiments, the one or more sensors are used in any combination. In one or more example embodiments, the one or more sensors are used redundantly to validate and enhance the accuracy of the detection and the overall performance of the vortex generator 10.

During operation of the aircraft, the processors 51 are operable to select one or more sensors of the sensor module 60 to detect the flight environment based on current given flight conditions including, but not limited to flight altitude, flight speed, ambient temperature, etc. Additionally or alternatively, the processors 51 are operable to select one or more sensors of the sensor module 60 to detect the vortex generator 10, including, but not limited to the current deployment angle of the vane 20, the aerodynamic load on the vane 20, etc.

In one or more example embodiments, the processors 51 are operable to receive the sensor data, store the sensor data in the one or more data stores 52, conduct an evaluation of the sensor data, and control the vortex generator 10 in response to the evaluation.

Figure 6:
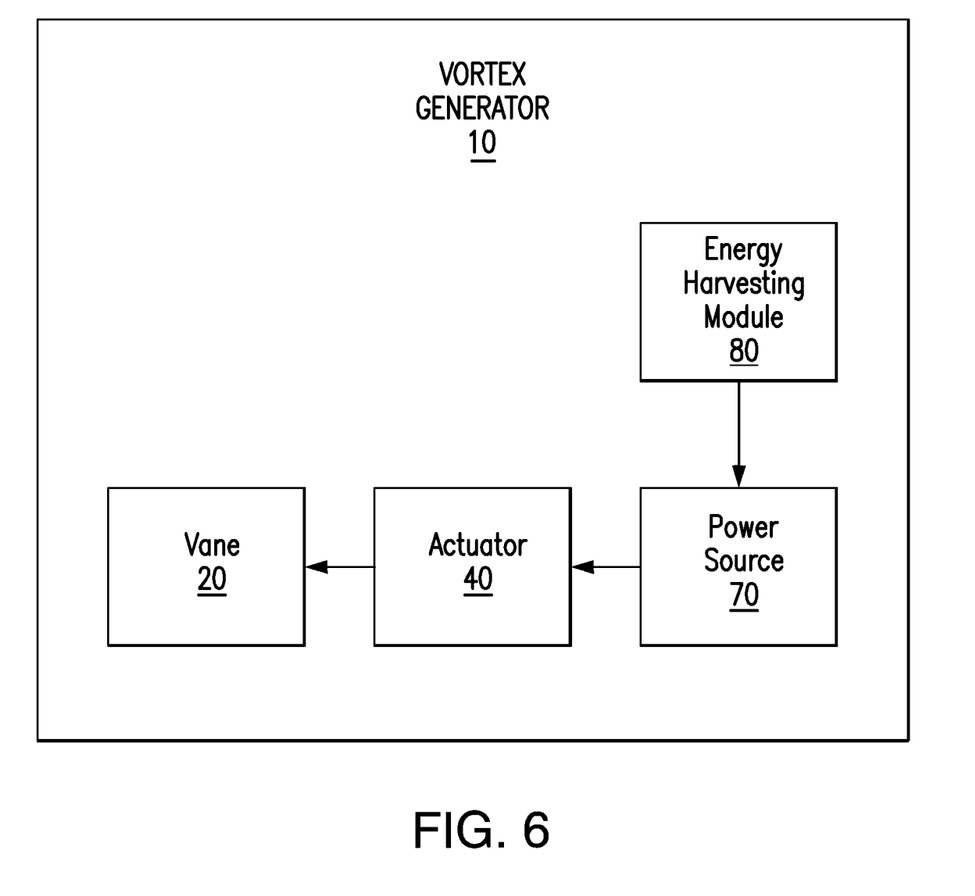
FIG. 6 illustrates a block diagram of an advantageous example of a vortex generator.

In the one or more illustrated examples of FIG. 6, the vortex generator 10 comprises a power source 70 such as, for example, a wireless power source which is operable to activate and/or reset the actuator 40, particularly for use in an example actuator 40 that is composed of an SMA having a higher transition temperature. In one or more example embodiments, the power source 70 is controlled by the control module 50. The power source 70 comprises one or more rechargeable batteries having a plurality of rechargeable cells. For purposes of recharging the power source 70, an energy harvesting module 80 comprising one or more energy harvesting arrays is operable to deliver harvested energy to the one or more rechargeable batteries. This disclosure contemplates use of any suitable configuration that falls within the spirit and scope of the principles of this disclosure set forth herein.

Figure 7:
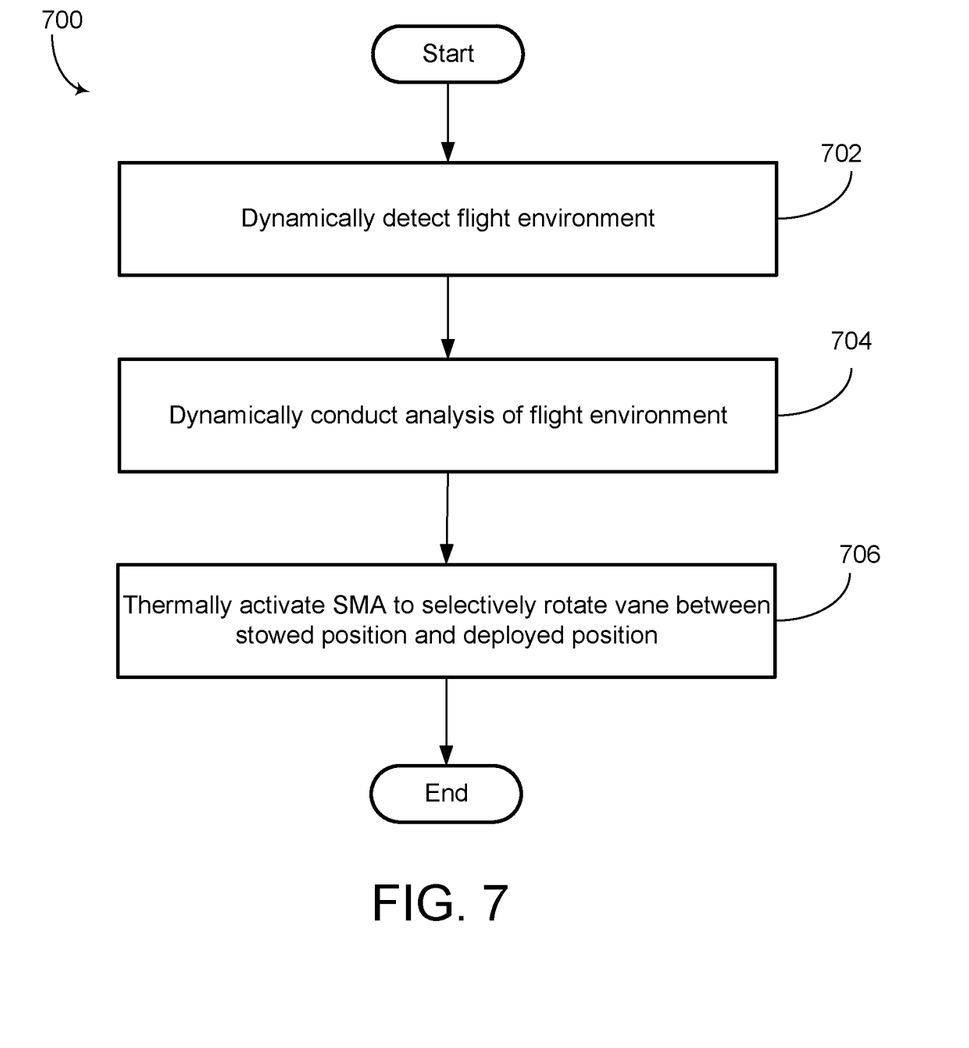
FIGS. 7 and 8 respectively illustrates an advantageous example of a method of operating an aircraft.
Figure 8:
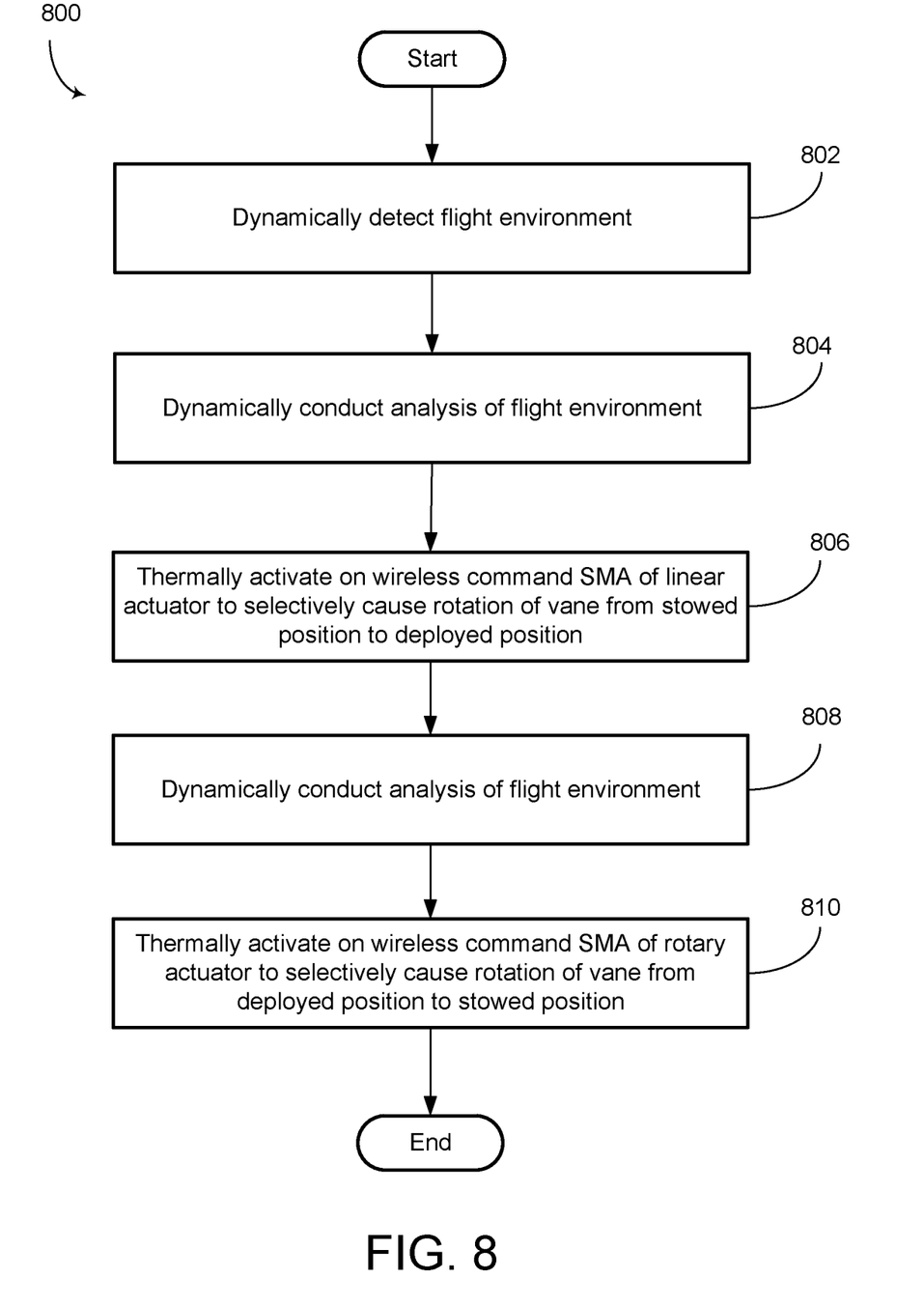

In the one or more illustrated examples of FIGS. 7 and 8, a flowchart of methods 700 and 800 of operating an aircraft. In one or more example embodiments, the respective flowcharts of the methods 700 and 800 are implemented by the one or more processors 51 of the control module 50. For example, the one or more processors 51 of the control module 50 are operable to implement the methods 700 and 800 using logic instructions (e.g., software), configurable logic, fixed-functionality hardware logic, etc., or any combination thereof. In one or more example embodiments, software executed by the control module 50 provides functionality described or illustrated herein. In particular, software executing by the one or more processors 51 of the control module 50 is operable to perform one or more processing blocks of the methods 700 and 800 set forth, described, and/or illustrated herein, or provides functionality set forth, described, and/or illustrated.

In the illustrated example of FIG. 7, illustrated process block 702 includes dynamically detecting a flight environment of an aircraft and a vortex generator that is mountable on an aerodynamic surface of the aircraft, the vortex generator comprising a vane and an actuator module operatively connected to the vane. In one or more example embodiments, the actuator module comprises one or more of a linear actuator and a rotary actuator, each actuator respectively composed at least in part of a shape memory alloy (SMA).

The method 700 may then proceed to illustrated process block 704, which includes dynamically conducting a flight environment analysis of the flight environment. In one or more example embodiments, the analysis is conducted on one or more aspects of the flight environment, including but not limited to current flight altitude, current ambient temperature, current vane position, current deployment angle of the vane, and current aerodynamic load on the vane.

The method 700 may then proceed to illustrated process block 706, which includes thermally activating the SMA of one or more of the linear actuator and the rotary actuator to selectively cause rotation of the vane between a stowed position and a deployed position.

The method 700 may terminate or end after execution of process block 706.

In the illustrated example of FIG. 8, illustrated process block 802 includes dynamically detecting a flight environment of an aircraft and a vortex generator that is mountable on an aerodynamic surface of the aircraft. In one or more example embodiments, the actuator module comprises one or more of a linear actuator and a rotary actuator, each actuator respectively composed at least in part of a shape memory alloy (SMA).

The method 800 may then proceed to illustrated process block 804, which includes dynamically conducting an analysis of the flight environment. In one or more example embodiments, the analysis is conducted on one or more aspects of the flight environment, including but not limited to current flight altitude, current ambient temperature, current vane position, current deployment angle of the vane, and current aerodynamic load on the vane.

The method 800 may then proceed to illustrated process block 806, which includes thermally activating on wireless command, based on the analysis, the SMA of the linear actuator to selectively cause rotation of the vane from a stowed position to a deployed position.

The method 800 may then proceed to illustrated process block 808, which includes dynamically conducting another analysis of the flight environment. In one or more example embodiments, the analysis is conducted on one or more aspects of the flight environment, including but not limited to current flight altitude, current ambient temperature, current vane position, current deployment angle of the vane, and current aerodynamic load on the vane.

The method 800 may then proceed to illustrated process block 810, which includes thermally activating on wireless command, based on the analysis, the SMA of the rotary actuator to selectively cause rotation of the vane from the deployed position to the stowed position.

The method 800 may terminate or end after execution of process block 810.

The terms "coupled," "attached," or "connected" used herein is to refer to any type of relationship, direct or indirect, between the components in question, and is to apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner.

Those skilled in the art will appreciate from the foregoing description that the broad techniques of the examples of the present disclosure is to be implemented in a variety of forms. Therefore, while the present disclosure describes matters in connection with particular examples thereof, the true scope of the examples of the present disclosure should not be so limited since other modifications will become apparent to the skilled practitioner upon a study of the drawings, specification, and following claims.

What is claimed is:

1. An aircraft system, comprising:
   a vortex generator that includes a vane, mountable on an aerodynamic surface of the aircraft for rotation between a stowed position and a deployed position, and an actuator module operatively connected to the vane, the actuator module including a linear actuator and a rotary actuator respectively composed at least in part of a shape memory alloy (SMA), wherein the linear actuator comprises a latch member, a bias member, and one or more wire members, wherein the latch member is operable to maintain the vane in the stowed position, wherein thermal activation of an SMA of the one or more wire members causes the latch member to alternate between disengagement and engagement by overcoming biasing force placed on the latch member by the bias member, and
   a control module having one or more processors to execute a set of instructions that cause the one or more processors to conduct, in response to sensor data related to a flight environment of the aircraft and the vortex generator, flight environment analysis, and transmit, based on the flight environment analysis, a wireless command signal to cause thermal activation of the SMA to selectively move the vane between the stowed position and the deployed position.

2. The aircraft system of claim 1, further comprising a sensor module, operatively coupled to the control module, to dynamically detect the flight environment of the aircraft and the vortex generator, wherein the flight environment comprises one or more of current flight altitude, current ambient temperature, current position of the vane, current deployment angle of the vane, and current aerodynamic load on the vane.

3. The aircraft system of claim 1, wherein the vane comprises a substantially planar body having a recess formed at a side surface thereof.

4. The aircraft system of claim 3, wherein:
   the latch member being operable to engage the recess to maintain the vane in the stowed position, and the one or more wire members being operatively connected to the latch member, and
   the rotary actuator comprises a substantially cylindrical body, composed of an SMA.

5. The aircraft system of claim 4, wherein thermal activation of the SMA of the one or more wire members causes disengagement of the latch member from the recess and rotation of the vane from the stowed position and the deployed position.

6. The aircraft system of claim 4, wherein thermal activation of the SMA of the substantially cylindrical body causes rotation of the substantially cylindrical body and rotation of the vane from the deployed position to the stowed position.

7. The aircraft system of claim 1, further comprising:
   a power source, including one or more rechargeable batteries, that is operatively connected to the control module and the actuator module; and
   an energy harvesting module to deliver harvested energy to the one or more rechargeable batteries.

8. A vortex generator, comprising:
   a vane, mountable on an aerodynamic surface of an aircraft for rotation between a stowed position and a deployed position; and
   an actuator module operatively connected to the vane, the actuator module including a linear actuator and a rotary actuator respectively composed at least in part of a shape memory alloy (SMA) operable to, when thermally activated in response to a wireless command signal, selectively rotate the vane between the stowed position and the deployed position, wherein the linear actuator comprises a latch member, a bias member, and one or more wire members, wherein the latch member is operable to maintain the vane in the stowed position, wherein thermal activation of an SMA of the one or more wire members causes the latch member to alternate between disengagement and engagement by overcoming biasing force placed on the latch member by the bias member.

9. The vortex generator of claim 8, wherein the wireless command signal is sent in response to an analysis of one or more of current flight altitude, current ambient temperature, current position of the vane, current deployment angle of the vane, and current aerodynamic load on the vane.

10. The vortex generator of claim 8, wherein the vane comprises a substantially planar body having a recess formed at a side surface thereof.

11. The vortex generator of claim 10, wherein:
    the latch member being operable to engage the recess to maintain the vane in the stowed position, and the one or more wire members being operatively connected to the latch member, and
    the rotary actuator comprises a substantially cylindrical body, composed of an SMA.

12. The vortex generator of claim 11, wherein thermal activation of the SMA of the one or more wire members causes disengagement of the latch member from the recess and rotation of the vane from the stowed position and the deployed position.

13. The vortex generator of claim 11, wherein thermal activation of the SMA of the substantially cylindrical body causes rotation of the substantially cylindrical body and rotation of the vane from the deployed position to the stowed position.

14. The vortex generator of claim 11, further comprising:
    a power source, including one or more rechargeable batteries, that is operatively connected to the actuator module; and
    an energy harvesting module to deliver harvested energy to the one or more rechargeable batteries.

15. A method of operating an aircraft, the method, comprising:

dynamically detecting a flight environment of the aircraft and a vortex generator an aircraft and a vortex generator that is mountable on an aerodynamic surface of the aircraft, the vortex generator comprising a vane and an actuator module operatively connected to the vane, the actuator module including a linear actuator and a rotary actuator respectively composed at least in part of a shape memory alloy (SMA), wherein the linear actuator comprises a latch member, a bias member, and one or more wire members, wherein the latch member is operable to maintain the vane in a stowed position, wherein thermal activation of an SMA of the one or more wire members causes the latch member to alternate between disengagement and engagement by overcoming biasing force placed on the latch member by the bias member;

dynamically conducting, in response to the dynamic detection, a flight environment analysis; and thermally activating on wireless command, based on the flight environment analysis, the SMA to selectively cause rotation of the vane between the stowed position and a deployed position.

16. The method of claim 15, wherein the flight environment analysis is conducted on one or more of current flight altitude, current ambient temperature, current position of the vane, current deployment angle of the vane, and current aerodynamic load on the vane.

17. The method of claim 15, wherein the vane comprises a substantially planar body having a recess formed at a side surface thereof.

18. The method of claim 17, wherein the latch member being operable to engage the recess to maintain the vane in the stowed position.

19. The method of claim 18, wherein:

the one or more wire members being operatively connected to the latch member, and thermally activating the SMA comprises thermally activating the SMA of the one or more wire members to cause disengagement of the latch member and the recess and rotation of the vane from the stowed position and the deployed position.

20. The method of claim 15, wherein:

the rotary actuator comprises a substantially cylindrical body, composed of an SMA, and thermally activating the SMA comprises thermally activating the SMA of the substantially cylindrical body to rotate the substantially cylindrical body and cause rotation of the vane from the deployed position to the stowed position.

* * * * *